(12) United States Patent
Luecken et al.

(10) Patent No.: US 9,371,139 B2
(45) Date of Patent: Jun. 21, 2016

(54) ENERGY SUPPLY SYSTEM, AIRCRAFT OR SPACECRAFT AND METHOD

(71) Applicant: Airbus Operations GmbH, Hamburg (DE)

(72) Inventors: Arno Luecken, Hamburg (DE); Detlef Schulz, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 726 days.

(21) Appl. No.: 13/684,209

(22) Filed: Nov. 22, 2012

(65) Prior Publication Data

US 2013/0134776 A1 May 30, 2013

Related U.S. Application Data

(60) Provisional application No. 61/563,980, filed on Nov. 28, 2011.

(30) Foreign Application Priority Data

Nov. 28, 2011 (DE) .......................... 10 2011 087 015

(51) Int. Cl.
*B60L 1/00* (2006.01)
*B60L 3/00* (2006.01)
(Continued)

(52) U.S. Cl.
CPC . *B64D 33/00* (2013.01); *H02J 1/08* (2013.01); *B64D 2041/005* (2013.01); *B64D 2221/00* (2013.01); *H02J 2001/008* (2013.01); *Y02T 50/54* (2013.01); *Y02T 90/36* (2013.01)

(58) Field of Classification Search
CPC . Y02T 10/7005; Y02T 90/121; Y02T 90/122; Y02T 90/14; Y02T 10/705; Y02T 10/7055; Y02T 10/7088; Y02T 10/7216; Y02T 10/7241; Y02T 10/725; Y02T 90/12; Y02T 90/125; Y02T 90/127; Y02T 90/128
USPC .......................................... 307/9.1
See application file for complete search history.

(56) References Cited

U.S. PATENT DOCUMENTS 4,400,624 A * 8/1983 Ebert, Jr. .......................... 307/43
4,763,013 A * 8/1988 Gvoth et al. .................... 307/66
(Continued)

FOREIGN PATENT DOCUMENTS

DE 37 17 716 10/1987
DE 196 18 882 11/1997
(Continued)

OTHER PUBLICATIONS

German Office Action, May 16, 2012.

*Primary Examiner* — Jared Fureman
*Assistant Examiner* — Esayas Yeshaw
(74) *Attorney, Agent, or Firm* — Greer, Burns & Crain Ltd.

(57) ABSTRACT

An energy supply system, an aircraft and spacecraft using such an energy supply system and a method for providing electrical energy with the energy supply system. The energy supply system comprises an energy source which generates a direct current or a direct voltage. A converter is coupled to the energy source and is designed to convert the generated direct current or the generated direct voltage into an output current specified for the energy supply system or an output voltage specified for the energy supply system. A switching device is designed to couple an output of the energy supply system to the converter or directly to the energy source as a function of the electrical power required by the energy supply system.

13 Claims, 3 Drawing Sheets

(51) Int. Cl.
*H02G 3/00* (2006.01)
*B64D 33/00* (2006.01)
*H02J 1/08* (2006.01)
*B64D 41/00* (2006.01)
*H02J 1/00* (2006.01)

(56) References Cited

U.S. PATENT DOCUMENTS

| | | | |
|---|---|---|---|
| 5,161,097 A | 11/1992 | Ikeda | |
| 5,612,580 A * | 3/1997 | Janonis et al. | 307/64 |
| 5,914,542 A * | 6/1999 | Weimer et al. | 307/125 |
| 7,177,168 B2 * | 2/2007 | Toyomura et al. | 363/131 |
| 7,781,992 B2 * | 8/2010 | Acker | 318/105 |
| 7,915,760 B2 * | 3/2011 | Evans, Sr. | 307/46 |
| 2011/0055599 A1 * | 3/2011 | Zhao | 713/300 |

FOREIGN PATENT DOCUMENTS

| | | |
|---|---|---|
| DE | 10 2005 027 081 | 5/2006 |
| DE | 10 2007 017 820 | 8/2008 |
| DE | 10 2009 052 836 | 5/2011 |
| EP | 0 972 668 | 1/2000 |

\* cited by examiner

ENERGY SUPPLY SYSTEM, AIRCRAFT OR SPACECRAFT AND METHOD

BACKGROUND OF THE INVENTION

Although it may be applied to many energy supply systems, the present invention and the underlying problems are explained in detail below with respect to energy supply systems for aircraft.

In modern aircraft and spacecraft, especially in modern passenger aircraft, demand for electrical energy continues to rise. One reason for this, inter alia, is the implementation of the so-called more-electric-aircraft concept. In this concept, previously hydraulically or pneumatically operated systems are replaced by purely electrically operated systems. This thus avoids energy conversion losses. Transmission losses from electrical systems are also generally lower than from hydraulically or pneumatically operated systems. Electrical systems also have a high level of diagnostic capability.

An aircraft has energy supply systems in order to generate and provide the necessary electrical energy. These energy supply systems obtain the electrical energy by means of generators, for example, which are provided on the aircraft engines. Alternatively, or additionally, batteries or fuel cells may also be used as energy sources. The output voltage of such an energy supply system is load-dependent and is thus not constant. Converters which are specifically intended for this purpose are used, which convert an output voltage of the energy supply system into a supply voltage which is suitable for operating the various electrical systems in the aircraft. Traditional converters are designed to operate over the entire output voltage range and power range of the respective energy source. This means that the converter is operated both when the energy source is idle with maximum voltage and minimum power, and with minimal output voltage and maximum electrical power.

Such traditional converters have a standard efficiency of approximately 94%. With an electrical output power of 60 kW, the power lost by the converter is approximately 3.6 kW, which is equivalent to a relatively poor efficiency rate for the energy supply system. In addition, cooling needs to be provided for the converter to dissipate or cool the relatively high power loss of up to 3.6 kW which is expressed as heat loss. Provision of such a cooling system increases the weight of the converter to an undesirable extent.

SUMMARY OF THE INVENTION

An energy supply system, especially for an aircraft or spacecraft, comprises an energy source which generates a direct current or a direct voltage, a converter which is coupled to the energy source and which is designed to convert the generated direct current or the generated direct voltage into an output current specified for the energy supply system or an output voltage specified for the energy supply system, and a switching device which is designed to couple an output of the energy supply system to the converter or directly to the energy source as a function of the electrical power required by the energy supply system.

An aircraft or spacecraft comprising at least one electrical load and one energy supply system according to the invention which is coupled to at least one of the electrical loads on the supply side to supply electrical energy.

A method for providing electrical energy, especially for an aircraft and spacecraft, including steps such as providing an energy supply system according to the invention, recording the electrical power required by the energy supply system and coupling an output of the energy supply system to a converter or directly to an energy source as a function of the recorded electrical power.

The fact underlying the present invention is that under certain circumstances an energy source supplies a voltage which can be processed directly by devices coupled to the energy source. The concept underlying the present invention comprises taking this fact into account and providing an energy supply system in which a converter is connected or bypassed between the energy source and the users as a function of the electrical power required by the energy supply system.

Energy sources supply an output voltage which varies as a function of different basic conditions. Amongst other things, the output voltage supplied by a direct current source varies as a function of the power required by the direct current source. In batteries, this effect is caused for example by the internal resistance of the battery, in which an increasing voltage reduces as the current increases. Thus, the output voltage of the battery falls as the load on the battery increases. Fuel cells also supply an ever decreasing output voltage as the current increases.

If the energy supply system then requires a power which causes the direct current source to supply an output voltage which lies within the specifications of the users coupled to the energy supply system, the output voltage can be transferred directly to the coupled users without the need for voltage conversion.

In other words, the converter only needs to be connected between the energy source and the users if the energy source provides a voltage which lies outside the specifications of the coupled users.

As a result of the present invention, energy supply systems can be dimensioned for smaller power levels as there is no power loss from the converter, especially if a maximum power is required by the energy supply system. In turn, this makes it possible to reduce the electrical power installed in the energy supply system and thus design the energy source to be smaller, lighter and more favourable.

Finally, the converter can also be designed for lower maximum power levels as the converter is not coupled in a current path of the energy supply system, especially if a maximum power is required by the energy supply system. This reduces the size and weight of the converter.

Advantageous embodiments and developments of the invention are described in the additional subordinate claims and in the description with reference to the drawing figures.

In accordance with an embodiment of the invention, a bypass device is provided and the switching device is designed to couple the output of the energy supply system either indirectly to the energy source via the converter or directly to the energy source via the bypass device. This makes it possible to design a very simple energy supply system according to the invention.

According to an embodiment of the invention, the switching device comprises a switch, a voltage sensor which is designed to record an electrical voltage at the energy source, and a control device which is designed to control the switch as a function of the recorded voltage such that the output of the energy supply system is either coupled indirectly to the energy source via the converter or directly to the energy source via the bypass device. The voltage provided by the energy source depends on the power required in the energy supply system. Merely recording the voltage provided by the energy source constitutes a very simple option for providing data which identifies the power required by the energy supply system. It is therefore possible to provide a switching device which is not very complex and which can be controlled on the basis of merely one voltage value.

According to an embodiment of the invention, the control device has a first operating mode in which the output from the energy supply system is indirectly coupled to the energy source via the converter, the control device being designed to control the switch in the first operating mode in such a way that the output of the energy supply system is coupled directly to the energy source via the bypass device if the absolute value of the recorded voltage is lower than a first voltage threshold.

According to a further embodiment of the invention, the control device has a second operating mode in which the output of the energy supply system is directly coupled to the energy source via the bypass device, the control device being designed to control the switch in the second operating mode in such a way that the output of the energy supply system is coupled indirectly to the energy source via the converter if the absolute value of the recorded voltage is higher than the first voltage threshold and lower than a second voltage threshold. The second voltage threshold also has a higher absolute value than the first voltage threshold, the absolute value of the second voltage threshold being lower than an open circuit voltage of the energy source.

If the control device is in the first operating mode and controls the switch such that the output of the energy supply system is coupled directly to the energy source via the bypass device, the power lost by the converter no longer affects the energy source. The voltage provided by the energy source thus rises. With a single threshold, this would cause the switch to switch again. If two thresholds are preset instead of a single preset threshold for the switch to switch, it is possible to define a switch hysteresis for the switching device. This makes it possible to prevent the switch from oscillating. It also permits clean and defined switching between energy supplied via the converter and direct energy supplied by the energy source.

According to an embodiment of the invention, the first voltage threshold and the second voltage threshold are defined such that a difference between the absolute value of the second voltage threshold and the absolute value of the first voltage threshold is higher than the voltage by which the output voltage of the energy source rises if the output of the energy supply system is coupled directly to the energy source via the bypass device in the first operating mode. This thus ensures that the increased voltage at the direct voltage source does not cause the switch to switch again in the event of the load not being applied at the direct voltage source due to power loss from the converter.

According to one embodiment of the invention, a first output path and at least one second output path are provided, each output path comprising an energy source, a converter, a switching device and an output. In a first embodiment of the invention, a switch point is also provided which is coupled to the negative pole of the energy source of the first output path and to the positive pole of the energy source of the second output path, the first output path being designed to provide a positive voltage and the second output path being designed to provide a negative voltage. This makes it possible to adapt an energy supply system according to the invention to a wide range of applications in a flexible manner.

According to one embodiment of the invention, the energy source is a fuel cell. Additionally or alternatively, the energy source may be a battery and/or an accumulator and/or a generator coupled to an aircraft engine. If a fuel cell is used as an energy source in an energy supply system according to the invention, the converter is only required in a partial load range of the fuel cell. As the total output power of the fuel cell is provided at the output of the energy supply system in the case of maximum load and there is no power loss due to the converter, the size of the hydrogen store and its weight can thus be reduced. In addition, the quantity of hydrogen required is reduced, which in turn reduces the cost of operating an energy supply system according to the invention.

The above embodiments and developments can be combined in any conceivable combination. Further possible embodiments, developments and uses of the invention also include combinations of features of the invention described previously or below with respect to the embodiments, even if not explicitly specified. In particular, persons skilled in the art will also add individual aspects as improvements or additions to the respective basic form of the present invention in this case.

BRIEF DESCRIPTION OF THE DRAWINGS

The present invention is explained below in greater detail by reference to embodiments specified in the schematic figures in the drawing. These are as follows.

Figure 1:
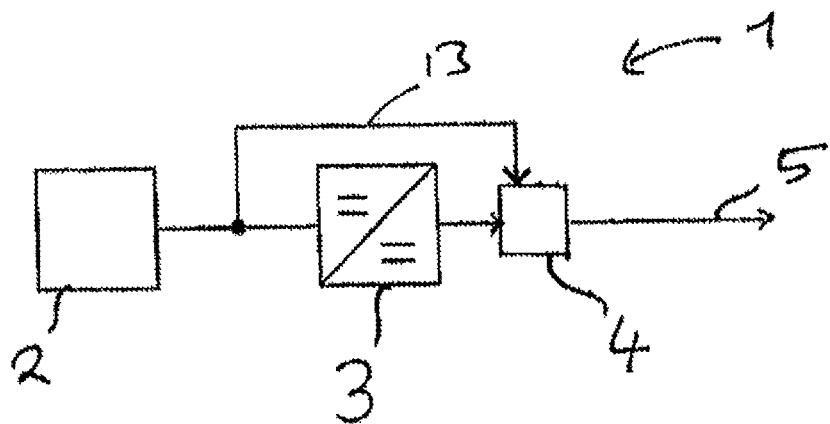
FIG. 1 a block diagram of an embodiment of an energy supply system according to the invention.

The enclosed drawings should convey further understanding of the embodiments of the invention. They illustrate embodiments of the invention and clarify the principles and concepts behind the invention in conjunction with the description. Other embodiments and many of the described advantages are apparent with respect to the drawings. The elements of the drawings are not necessarily illustrated true to scale in relation to each other.

In the figures in the drawing, the same elements, features and components or those serving the same function and having the same effect are furnished with the same reference numerals in each case unless otherwise specified.

DETAILED DESCRIPTION OF THE PREFERRED EMBODIMENTS

FIG. 1 shows a block diagram of an embodiment of an energy supply system 1 according to the invention.

The energy supply system 1 in FIG. 1 comprises a fuel cell 2 and a converter 3, which is coupled to the fuel cell 2. The energy supply system 1 also comprises a switching device 4 which is coupled to the converter 3. Finally, the energy supply system 1 comprises a bypass device 13 which is coupled to the fuel cell 2 and the switching device 4.

Figure 5:
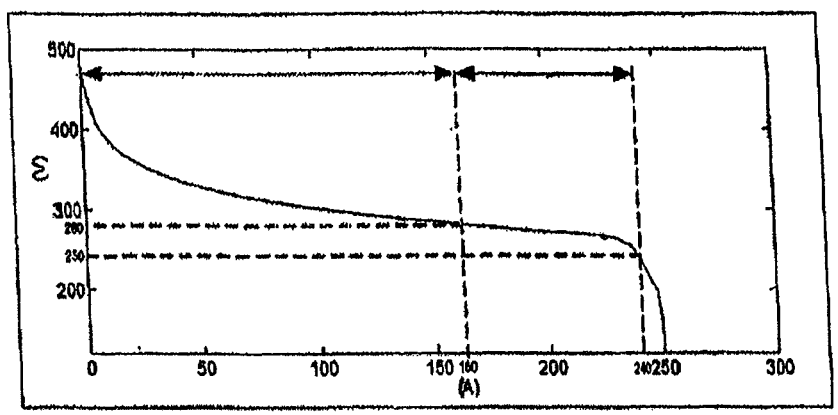
FIG. 5 a diagram which shows the change in voltage in a fuel cell as a function of the current.

The fuel cell 2 in FIG. 1 generates an output voltage as a function of the current required in the energy supply system 10, as shown in FIG. 5.

The switching device 4 is designed such that a voltage of between 280 V DC and 250 V DC is provided at the output 5 of the energy supply system 1. In this case an upper voltage of 280 V DC and a lower voltage of 250 V DC are stipulated by Specification MIL-STD-704F for aircraft or spacecraft.

The switching device 4 also couples the output 5 of the energy supply system 1 indirectly to the fuel cell 2 via the converter 3 provided that the voltage of the fuel cell 2 is higher than the first voltage threshold, which is 275 V DC. If the voltage falls below 275 V DC, the switching device 4 couples the output 5 of the energy supply system 1 directly to the fuel cell 2 via the bypass device 13. If the load at the fuel cell 2 falls, the voltage at the output of the fuel cell 2 rises again. However, to prevent the switching device 4 from oscillating, the switching device 4 does not couple the output 5 of the energy supply system 1 indirectly to the fuel cell 2 via the converter 3 if the voltage reaches 275 V DC again, but only couples the output 5 of the energy supply system 1 indirectly to the fuel cell 2 via the converter 3 at a voltage which is higher than the first voltage threshold of 275 V DC and lower than the second voltage threshold of 280 V DC.

In an embodiment of the invention, the voltages to switch the switching device 4 are not selected on the basis of MIL-STD-704F, but are selected so as to be suitable for an application for example in the automotive industry, in buildings or similar applications. In addition, the voltage thresholds may also be defined on the basis of other standards.

In yet another embodiment of the invention, the energy source 2 is not designed as a fuel cell 2, but as a battery 2 which also has an open circuit voltage which is higher than the first and/or second voltage threshold.

Figure 2:
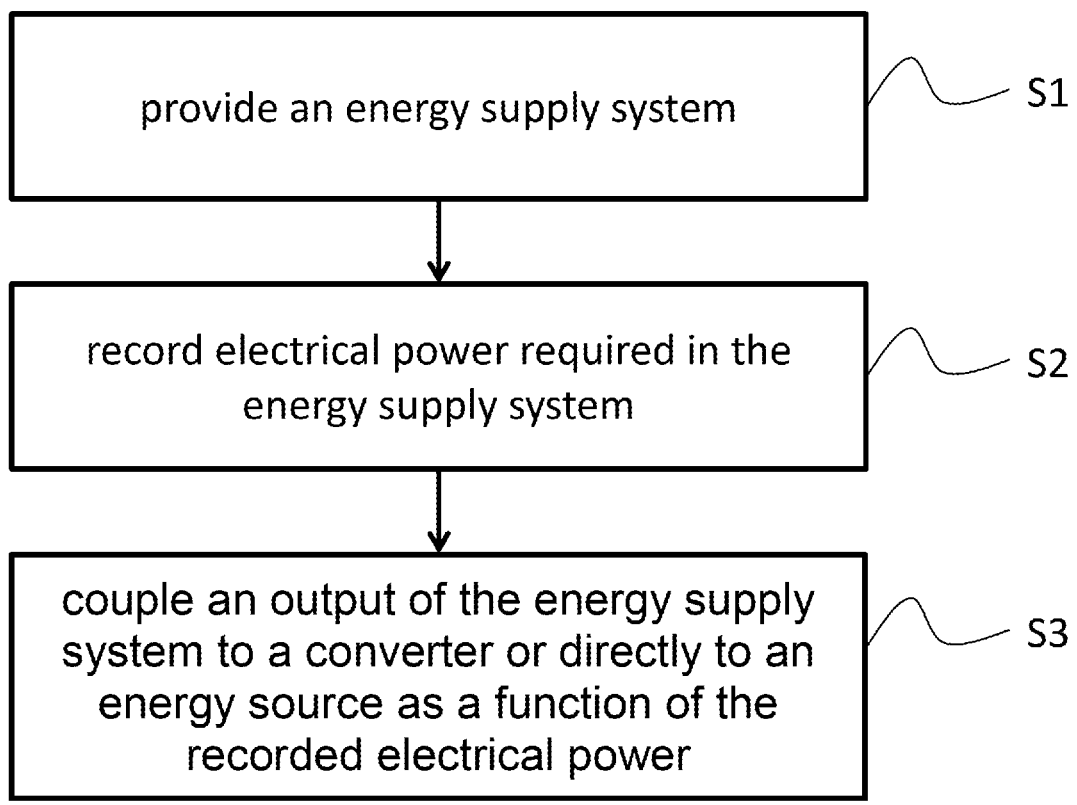
FIG. 2 a flow chart for an embodiment of a method according to the invention.

FIG. 2 shows a flow chart for an embodiment of a method according to the invention.

An energy supply system 1 according to the invention is provided in a first step S1. The electrical power required in the energy supply system is recorded in a second step S2. Finally, an output 5, 5a, 5b of the energy supply system 1 is coupled to a converter 3, 3a, 3b or directly to an energy source 2, 2a, 2b as a function of the recorded electrical power.

Figure 3:
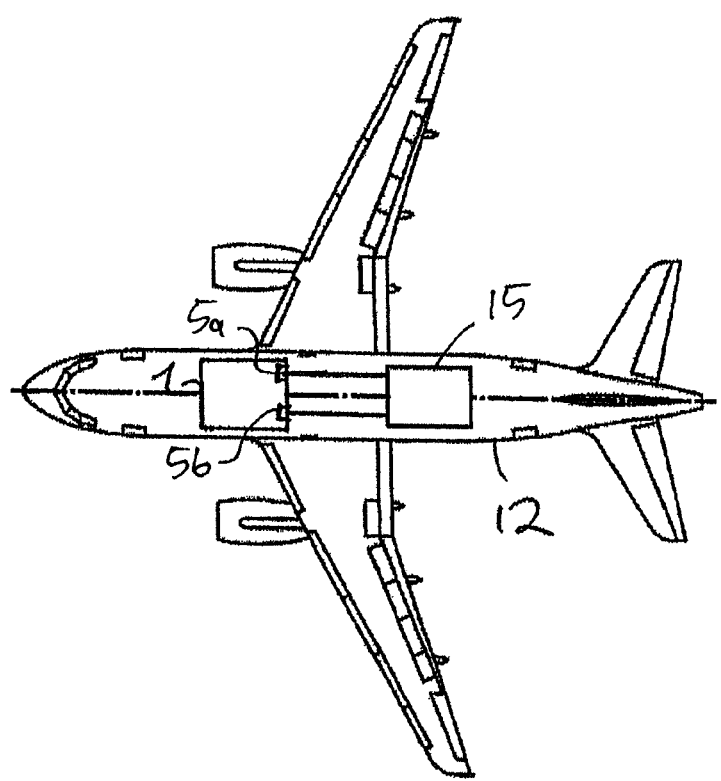
FIG. 3 a block diagram of an embodiment of an aircraft or spacecraft according to the invention.

FIG. 3 shows a block diagram of an embodiment of an aircraft or spacecraft 12 according to the invention.

The aircraft or spacecraft 12 in FIG. 3 is designed as an aircraft 12 which comprises an energy supply system 1 according to the invention. The energy supply system 1 in FIG. 3 comprises a first output 5a which provides a positive voltage and a second output 5b which provides a negative voltage. The energy supply system 1 is also designed such that the positive voltage has a value of between 250 V DC to 280 V DC and the negative voltage has a value from –250 V DC to –280 V DC.

The aircraft or spacecraft 12 also comprises an electrical user 15 which is coupled to the outputs 5a, 5b by means of electrical wires.

In further embodiments of the invention, the first output 5a comprises a different voltage range to the second output 5b.

Figure 4:
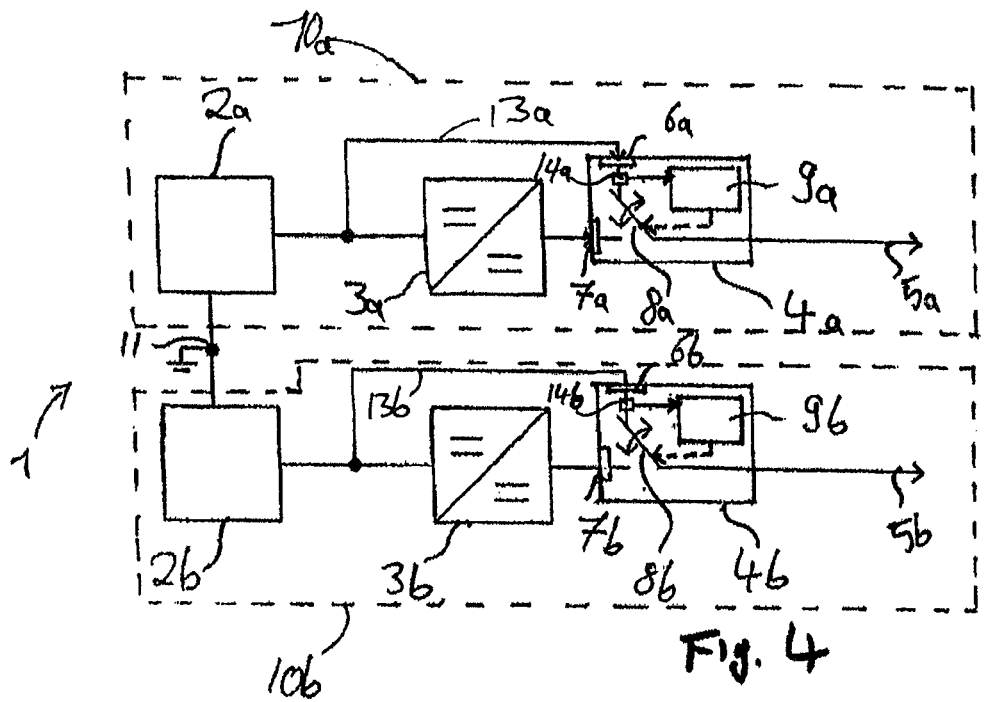
FIG. 4 a block diagram of a further embodiment of an energy supply system according to the invention.

FIG. 4 shows a block diagram of a further embodiment of an energy supply system 1 according to the invention.

Unlike the energy supply system 1 in FIG. 1, the energy supply system 1 in FIG. 4 comprises two output paths 10a and 10b. A switch point 11 is also provided which is coupled to a negative pole of the energy source 2a of the first output path 10a and which is coupled to a positive pole of the energy source 2b of the second output path 10b. The switch point 11 is also coupled to an earth potential.

Each of the output paths 10a, 10b comprises a fuel cell 2a, 2b and a converter 3a, 3b, which is coupled to the respective fuel cell 2a, 2b. The output paths 10a, 10b also each comprise a switching device 4a, 4b, each of which has a first input 6a, 6b, each of which is coupled to a bypass device 13a, 13b, which is in turn coupled to the respective energy source 2a, 2b and the respective switching device 4a, 4b. The switching devices 4a, 4b also each comprise a second input 7a, 7b which is coupled to the respective converter 3a, 3b.

Each of the switching devices 4a, 4b also comprises a voltage sensor 14a, 14b which is designed to record the voltage provided by the respective energy source 2a, 2b. Finally, each switching device 4a, 4b comprises a control device 9a, 9b which is coupled to a respective switch 8a, 8b in order to control this switch as a function of the voltage recorded by the respective voltage sensor 14a, 14b. The switches 8a, 8b are coupled to the first input 6a, 6b of the respective switching device 4a, 4b at a first switching input and to the second input 7a, 7b of the respective switching device 4a, 4b at a second switching input. The output connection of the first switch 8a is coupled to the first output 5a of the energy supply system 1 and the output connection of the second switch 8b is coupled to the second output 5b of the energy supply system 1.

FIG. 5 represents a diagram which shows the change in voltage in a fuel cell as a function of the current.

The voltage is plotted in Volts ranging from 0 Volts to 500 Volts on the y-axis of the diagram in FIG. 5. The current is plotted in Amperes from 0 Amps to 300 Amps on the x-axis. The curve showing the change in voltage as a function of current is shown in the diagram for a fuel cell 2, 2a, 2b such as may be used in an energy supply system 1 according to the invention. The curve starts at 0 A with an open circuit voltage in the fuel cell 2, 2a, 2b of approximately 480 Volts. The curve falls until approximately 230 A with a declining gradient to approximately 265 V. From 230 A to 250 A the curve falls with a steep gradient to 0 V.

Different regions are also identified in the diagram by means of dashed lines. A first dashed line runs vertically at 160 A and a second dashed line runs vertically at 240 A. The region to the left of the first dashed line identifies an operating region of the fuel cell 2, 2a, 2b in which the output voltage of the fuel cell is so high that it must be converted to a voltage of between 250 V and 280 V by the converter 3, 3a, 3b. The region in the diagram between the first and the second dashed line identifies the operating range of the fuel cell 2, 2a, 2b in which the output voltage of the fuel cell is between 250 V and 280 V, which means that voltage conversion by the converter 3, 3a, 3b is not necessary.

Finally, two horizontal dashed lines are also shown, the upper horizontal line being plotted at 280 V and the lower horizontal line being plotted at 250 V. The curve passes through the intersection of the upper horizontal line and the first vertical line and through the intersection of the lower horizontal line and the second vertical line.

The diagram in FIG. 5 clearly shows that the fuel cell 2, 2a, 2b provides a high output voltage with low load. As the output voltage of the fuel cell falls as the load increases, however, it is not necessary to use a converter 3, 3a, 3b when the fuel cell 2, 2a, 2b is subject to a high load as the output voltage of the fuel cell 2, 2a, 2b is then in the specified voltage range.

Although the present invention has been described here by means of preferred embodiments, it is not limited to the above, but may be modified in multiple ways.

For example, the energy supply system may be designed for voltage ranges which are used in motor vehicles, rail vehicles, ships or the like.

In a further embodiment of the invention, an energy supply system according to the invention may be incorporated for example in the energy supply for a building.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. An energy supply system, comprising:
   an energy source, which generates a direct current or a direct voltage,
   a converter coupled to the energy source and configured to convert the generated direct current or the generated direct voltage into an output current specified for the energy supply system or an output voltage specified for the energy supply system, and
   a switching device configured to couple an output of the energy supply system to the converter or directly to the energy source via a bypass device as a function of the electrical power required by the energy supply system,
   wherein the switching device comprises a switch, a voltage sensor configured to record an electrical voltage at the energy source, and a control device configured to control the switch as a function of the recorded voltage such that the output of the energy supply system is either coupled indirectly to the energy source via the converter or directly to the energy source via the bypass device, and
   wherein the control device comprises a first operating mode in which the output of the energy supply system is indirectly coupled to the energy source via the converter, the control device configured to control the switch in the first operating mode in such a way that the output of the energy supply system is coupled directly to the energy source via the bypass device if the absolute value of the recorded voltage is lower than a first voltage threshold.

2. The energy supply system according to claim 1, wherein the control device comprises a second operating mode in which the output of the energy supply system is directly coupled to the energy source via the bypass device, the control device being designed to control the switch in the second operating mode in such a way that the first output of the energy supply system is coupled indirectly to the energy source via the converter if the absolute value of the recorded voltage is higher than the first voltage threshold and lower than a second voltage threshold,
   the second voltage threshold having a higher absolute value than the first voltage threshold, and the absolute value of the second voltage threshold being lower than an open circuit voltage of the energy source.

3. The energy supply system according to claim 2, wherein the first voltage threshold and the second voltage threshold are defined such that a difference between the absolute value of the second voltage threshold and the absolute value of the first voltage threshold is higher than the voltage by which the output voltage of the energy source rises if the first output of the energy supply system is coupled directly to the energy source via the bypass device in the first operating mode.

4. The energy supply system according to claim 1, comprising a first output path and at least one second output path, each output path comprising an energy source, a converter, a switching device and an output.

5. The energy supply system according to claim 4, wherein a switch point is provided which is coupled to a negative pole of the energy source of the first output path and to a positive pole of the energy source of the second output path;
   the first output path being configured to provide a positive voltage and the second output path being configured to provide a negative voltage.

6. The energy supply system according to claim 1, wherein the energy source comprises a fuel cell and/or a battery and/or an accumulator and/or a generator coupled to an aircraft engine.

7. An aircraft or spacecraft comprising at least one electrical load and one energy supply system, according to claim 1, which is coupled to at least one of the electrical loads on the supply side to supply electrical energy.

8. A method to provide electrical energy, including the following steps:
   providing an energy supply system according to claim 1;
   recording the electrical power required in the energy supply system;
   coupling an output of the energy supply system to a converter or directly to an energy source as a function of the recorded electrical power,
   wherein, when recording the electrical power required by the energy supply system, the voltage provided by the energy source is recorded and wherein, when coupling the output, the output is either coupled indirectly to the energy source as a function of the recorded voltage via the converter or coupled directly to the energy source via a bypass device,
   wherein in a first operating mode in which the output of the energy supply system is indirectly coupled to the energy source via the converter, the output of the energy supply system is directly coupled to the energy source via the bypass device if the absolute value of the recorded voltage is lower than a first voltage threshold.

9. The method according to claim 8, wherein in a second operating mode in which the output of the energy supply system is directly coupled to the energy source via the bypass device, the output of the energy supply system is coupled indirectly to the energy source via the converter if the absolute value of the recorded voltage is higher than the first voltage threshold and lower than a second voltage threshold;
   the second voltage threshold having a higher absolute value than the first voltage threshold, and the absolute value of the second voltage threshold being lower than an open circuit voltage of the energy source.

10. The method according to claim 9, wherein the first voltage threshold and the second voltage threshold are defined such that the difference between the absolute value of the second voltage threshold and the absolute value of the first voltage threshold is higher than the voltage by which the output voltage of the energy source rises if the output of the energy supply system is coupled directly to the energy source via the bypass device.

11. The method according to claim 8, including the additional steps of:
    providing a first output path and at least one second output path, each output path comprising an energy source, a converter, a switching device and an output,
    providing one switch point which is coupled to a negative pole of the energy source of the first output path and to a positive pole of the energy source of the second output path, and the first output path providing a positive voltage and the second output path providing a negative voltage.

12. The energy supply system according to claim 1, wherein the energy source comprises a fuel cell and the switching device couples the output of the energy supply system indirectly to the fuel cell via the converter or directly to the fuel cell via the bypass device to prevent an overvoltage from being supplied at the output of the energy supply system.

13. The energy supply system according to claim 1, wherein the direct connection between the switch and the energy source consists of only a power line and no other elements.

* * * * *